United States Patent
Satran et al.

[11] Patent Number: 6,164,878
[45] Date of Patent: *Dec. 26, 2000

[54] CUTTING INSERTS

[75] Inventors: Amir Satran, Kfar Vradim; Igor Varshavsky, Nesher, both of Israel

[73] Assignee: Iscar Ltd., Tefen, Israel

[ * ] Notice: This patent issued on a continued prosecution application filed under 37 CFR 1.53(d), and is subject to the twenty year patent term provisions of 35 U.S.C. 154(a)(2).

[21] Appl. No.: 08/924,638

[22] Filed: Sep. 5, 1997

[30] Foreign Application Priority Data

Dec. 16, 1996 [IL] Israel ......................................... 119841

[51] Int. Cl.⁷ ............................. B23B 27/00; B26D 1/14
[52] U.S. Cl. .......................... 407/113; 407/102; 407/103; 407/114
[58] Field of Search ......................................... 407/114, 113, 407/33, 34, 35, 43, 47, 48, 51, 52, 53, 56, 66, 67, 69, 70, 101, 102, 103, 107

[56] References Cited

U.S. PATENT DOCUMENTS

| | | | |
|---|---|---|---|
| 637,495 | 11/1899 | Arnold | 407/113 |
| 1,838,520 | 12/1931 | Archer | 407/113 X |
| 4,812,087 | 3/1989 | Stashko | 407/42 |
| 5,199,827 | 4/1993 | Pantzar . | |
| 5,236,288 | 8/1993 | Flueckiger . | |
| 5,346,336 | 9/1994 | Rescigno | 407/113 X |
| 5,658,100 | 8/1997 | Deiss et al. | 407/48 X |
| 5,688,083 | 11/1997 | Boianjiu | 407/113 X |
| 5,733,073 | 3/1998 | Zitzlaff et al. | 407/102 X |

FOREIGN PATENT DOCUMENTS

| | | | |
|---|---|---|---|
| 0 300 172 A3 | 1/1989 | European Pat. Off. . | |
| 0 416 901 B1 | 7/1994 | European Pat. Off. . | |
| 2037629 | 7/1980 | Germany | 407/103 |
| 0019302 | 1/1987 | Japan | 407/104 |
| 2081142 | 2/1982 | United Kingdom | 407/103 |

*Primary Examiner*—Henry W. H. Tsai
*Attorney, Agent, or Firm*—Mark A. Friedman

[57] ABSTRACT

A cutting insert has an upper surface bounded by a cutting edge, a base, and a peripheral flank surface. The shape of the peripheral flank surface varies along the height of the cutting insert. Near the top of the peripheral flank surface, it conforms to the round or polygonal geometry of the cutting edge so as to provide support for the cutting edge. Lower down the cutting insert, the peripheral flank surface is shaped to provide transverse bearing surfaces which have considerably lower pressure angles, i.e., resistance to turning moments, than would be provided by the inherent geometry of the cutting edge. Preferably, these transverse bearing surfaces are formed by recessed features such as channels, and most preferably, as chevron-type channels. This latter possibility leads to a lower cross-sectional geometry which approximates to an n-pointed star.

23 Claims, 12 Drawing Sheets

FIG. 8 ed as a plurality of peripheral grooves disposed around the central axis, each peripheral groove having an internal surface configured to provide at least one bearing surface effective to bear against an abutment surface for resisting forces applied to the cutting insert.

CUTTING INSERTS

FIELD AND BACKGROUND OF THE INVENTION

The present invention relates to cutting tools and, in particular, it concerns indexable cutting inserts with round or polygonal cutting edges and tool holders therefor.

It is known to employ cutting inserts which have round or polygonal cutting edges mounted in a receiving pocket of a tool holder of a cutting tool. During a cutting operation (turning, milling, etc.), only a portion of the available cutting edge typically actually cuts the workpiece. The extent of this portion depends on the depth of cut. When a portion of an indexable cutting edge of a regular (e.g., polygonal) insert has been worked, the insert is indexed to present a whole new cutting edge.

In the case of cutting inserts with polygonal cutting edges, proper operation can only be achieved by securing the insert against rotation during use. Conventional teaching has relied on abutment surfaces resulting from the inherent polygonal shape of the cutting insert. However, especially in high torque applications, or in polygons with large numbers of sides, the inherent abutment geometry may prove inadequate to withstand torques which may result from cutting forces.

Cutting inserts with round cutting edges exhibit rotational symmetry and could theoretically be continuously indexable in any angular position to accommodate actually observed wear. In practice, however, round inserts have also become restricted to use with a discrete number of indexing stations, angularly spaced by an equal shift angle. The angular shift between the indexing stations is referred to as the "angular pitch" of the insert.

In order to make optimal use of a round cutting insert, it is desirable to prevent rotation of the insert from its indexed position during the cutting process, thereby limiting the wear to a defined portion of the cutting edge. This ensures that the portion of the cutting edge presented after repositioning is, in fact, un-used.

A number of designs have been suggested for anchoring round inserts against rotation. These designs may be subdivided into two types, namely, "seat-pinning" and "lateral abutment".

Examples of a seat-pinning design may be found in U.S. Pat. No. 5,236,288 to Flueckiger and European Patent Publication No. 300,172 to Stashko.

U.S. Pat. No. 5,236,288 to Flueckiger discloses a round indexable cutting insert which has radial grooves in its base. A conically tipped screw is mounted adjustably in the seat of an insert-receiving pocket with its tip projecting so as to engage one of the radial grooves in the base of the insert.

European Patent Publication No. 300,172 to Stashko discloses a similar design in which a pin projecting from the seat of an insert-receiving pocket engages a shaped recess in the base of a round cutting insert. The shaped recess is provided either in the form of a polygonal recess with the pin engaging its corners, or as a circular recess with a number of peripheral arcuate grooves shaped to receive the pin.

Both of the above designs suffer from limited torque-resisting capability. The torque-resisting surfaces are all small, relatively close to the central axis of the insert, and are limited to a small depth close to the base of the insert. Furthermore, the orientation of the contact surfaces between the pin and the recess is not optimal for reacting against an applied torque. This combination of poor size, location and orientation of the contact surfaces results in relatively large bearing forces acting on small abutment surfaces with an accompanying risk of breakage or incomplete locking.

An example of a lateral abutment design may be found in U.S. Pat. No. 3,546,336 to Rescigno. U.S. Pat. No. 3,346,336 to Rescigno discloses a round cutting insert which is provided with five angularly spaced flat facets in its circumferential edge surface. The facets are inclined outwards towards the top of the insert such that the upper ends of the facets are spaced below the cutting edge. A fixing or clamping screw secures the insert to the pocket of the tool holder, so that two adjacent facets are placed against corresponding flat contact areas formed on the inner surface of the holder.

Each two adjacent flat contact areas form an obtuse angle therebetween and each flat surface forms an acute angle with the axis of the insert, which is slightly larger than the abutment angle formed by the locating surface, so that the initial contact between the insert and the inner surface of the receiving pocket occurs adjacent the upper ends of the facets and these latter are pressed into the upper locating wall, when the insert is screwed into place by its clamping screw.

In this device, too, the torque-resistance capability is limited, particularly because of the limited surface of the contacting areas of the insert and the receiving pocket, and because the pressure angle (defined below) is close to 90°.

There is therefore a need for cutting inserts with circular or polygonal cutting edges which provide appropriately oriented abutment surfaces for opposing significant torques while allowing a relatively large number of indexing positions. There is also a need for tool holders for mounting such cutting inserts.

SUMMARY OF THE INVENTION

The present invention provides round and polygonal cutting inserts with peripheral flank surfaces shaped to provide abutment surfaces for opposing high torques, and corresponding tool holders.

The indexable inserts of the present invention may form part of sets of coordinated inserts and corresponding tool holder adapters for use with a tool holder of a single size and shape. The inserts and receiving pockets of the invention are of great value in many applications including, but not limited to, milling cutters, broaches, turning tools and the like.

The round or polygonal inserts of the present invention may be clamped in their receiving pockets firmly and precisely in any indexable position, thereby coupling the insert to its receiving pocket for resisting relatively large torques transmitted therebetween. The inserts are structurally defined to have a relatively small pressure angle when engaged with a corresponding abutment surface of a receiving pocket, in any indexable position of the insert, even with a relatively large number of indexing stations.

In one embodiment, the present invention provides an indexable insert which has a plurality of discrete bearing surfaces, three of which are used at a time.

The present invention also provides machine tools with receiving pockets configured and structured for receiving indexable inserts in a large number of indexing positions, while being capable of maintaining structural integrity under strong working torques.

According to the teachings of the present invention, there is provided a cutting insert having an upper surface bounded by a cutting edge, a base, a peripheral flank surface and a central axis, wherein the peripheral flank surface is shaped such that a first cross-section taken through the cutting insert perpendicular to the central axis and proximal to the upper surface exhibits a regular form, and such that an outer periphery of a second cross-section taken through the cutting insert perpendicular to the central axis at a point closer to the base exhibits a substantially n-pointed-star geometry where n is at least 3, the substantially n-pointed-star geometry featuring at least n recessed features and n pairs of co-linear lines corresponding to coplanar abutment surfaces.

According to a further feature of the present invention, the substantially n-pointed-star geometry includes perpendicular abutment surfaces.

According to a further feature of the present invention, the substantially n-pointed-star geometry extends from proximal to the base to at least about an eighth, and preferably at least about a quarter, of the height of the cutting insert.

There is also provided according to the teachings of the present invention, a cutting insert having an upper surface bounded by a cutting edge, a base, a peripheral flank surface and a central axis, wherein the peripheral flank surface is shaped such that a first cross-section taken through the cutting insert perpendicular to the central axis and proximal to the upper surface is bounded by a non-recessed form, and such that an outer periphery of a second cross-section taken through the cutting insert perpendicular to the central axis at a point closer to the base exhibits n-fold rotational symmetry where n is at least 5, the outer periphery of the second cross-section including recessed features for providing abutment surfaces for opposing torque about the central axis, the abutment surfaces including n pairs of co-planar abutment surfaces.

There is also provided according to the teachings of the present invention, a tool holder for receiving a cutting insert which has a circular or polygonal cutting edge and a plurality of angularly spaced substantially chevron-shaped peripheral flank surface recessed cut-outs, the tool holder comprising at least one insert receiving pocket, the pocket having a base for supporting the cutting insert, three lateral abutment surfaces, two of which are co-planar, located for abutting surfaces of two of the substantially chevron-shaped peripheral flank surface recessed cut-outs so as to oppose a torque applied to the cutting insert, and means for temporarily securing the cutting insert against the lateral abutment surfaces.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention provides round and polygonal cutting inserts with peripheral flank surfaces shaped to provide abutment surfaces for opposing high torques, and corresponding tool holders.

The principles and operation of cutting inserts and their corresponding tool holders according to the present invention may be better understood with reference to the drawings and the accompanying description.

Referring now to the drawings, FIGS. 1A–1E show a first embodiment of a cutting insert, generally designated 10, constructed and operative according to the teachings of the present invention.

For the purpose of clarifying certain features of the present invention, reference will be made to the "pressure angle" of abutment surfaces of an insert or a tool holder. The "pressure angle" as used herein in the specification and claims is defined as the angle, measured parallel to the plane of seating of the insert, between a tangent to the outermost torque-transmitting bearing surface of an insert, or of the corresponding abutment surface of the receiving pocket, and a radial line from the insert axis through the same surface. The force created by the pressure between the insert and the pocket at these bearing/abutting surfaces produces a torque which is equal to the vector product of the insert radius and the force. Thus, the torque is directly proportional to the cosine of the pressure angle.

Figure 1A:
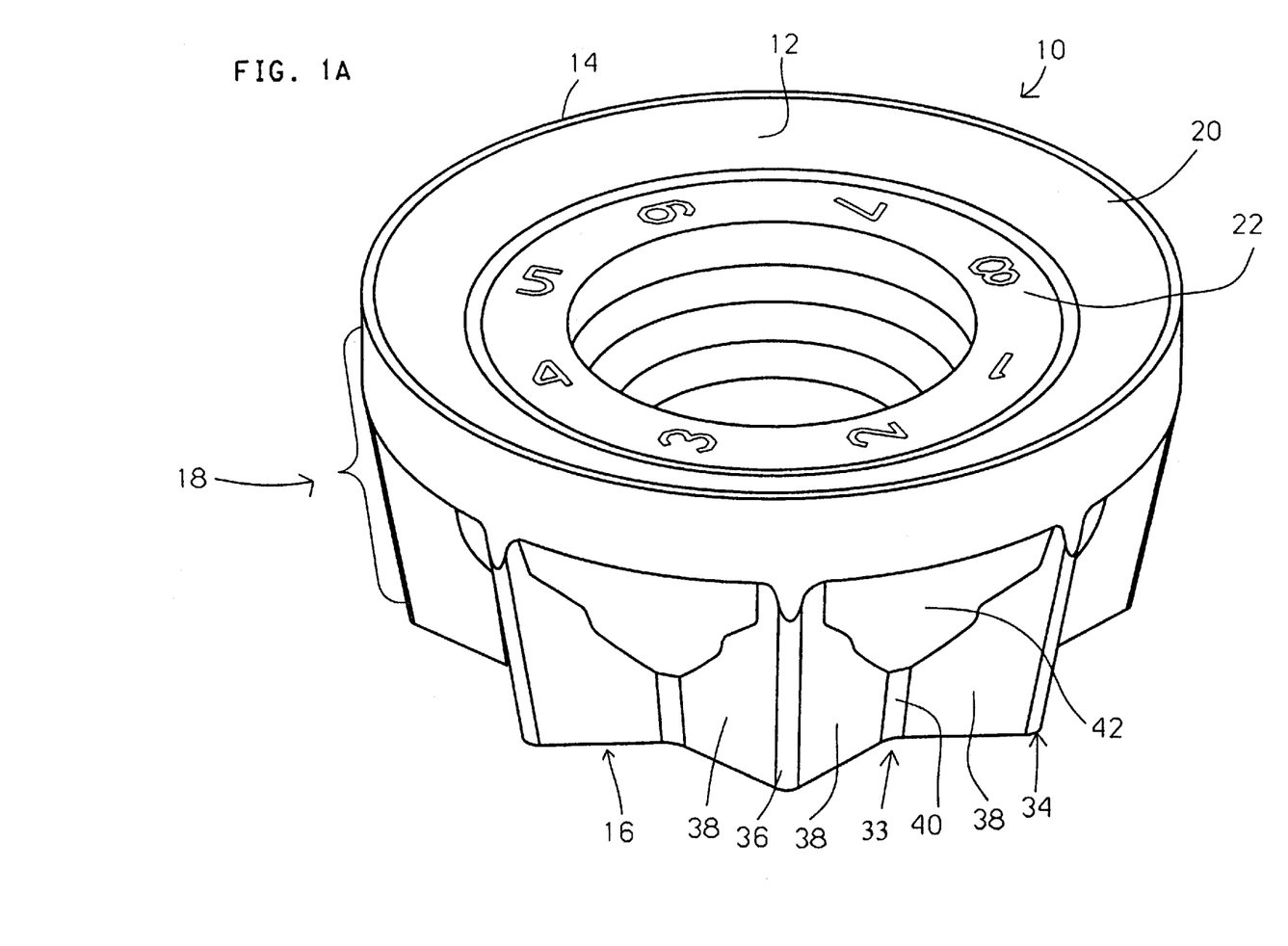
FIG. 1A is a perspective view of a first preferred embodiment of a cutting insert, constructed and operative according to the teachings of the present invention, having a round cutting edge.

In general terms, cutting insert 10 has an upper surface 12 bounded by a cutting edge 14, a base 16, and a peripheral flank surface 18. The shape of peripheral flank surface 18 varies along the height of cutting insert 10. Near the top of peripheral flank surface 18, it conforms to the round or polygonal geometry of the cutting edge so as to provide support for cutting edge 14. Lower down cutting insert 10, peripheral flank surface 18 is shaped to provide transverse bearing surfaces which have considerably lower pressure angles than would be provided by the inherent geometry of the cutting edge. Preferably, these transverse bearing surfaces are formed by recessed features such as channels, and most preferably, as chevron-type channels. This latter possibility leads to a lower cross-sectional geometry which approximates to an n-pointed star.

The phrase "n-pointed star" as used in the specification and claims refers to a rotationally symmetric shape with n outermost points each of which is joined to its nearest neighbors by an inward pointing chevron or "V-shape". An example of a 5-pointed star is shown in FIG. 2B. It should be noted that the lower peripheral flank surfaces of preferred embodiments of the present invention are described as having "approximately" or "substantially" n-pointed star geometry since the points and/or the chevron bases may be flattened, as will be described in more detail below.

It should be appreciated that the present invention is applicable to a wide range of cutting inserts with rotationally-symmetric cutting edges. The term "rotationally-symmetric" is used herein in the description and claims to refer to shapes which are invariant under at least two non-equivalent partial rotations. The term so defined includes regular polygons of three or more sides, whether straight-sided or made up of more complex combinations of straight or curved line segments. The term also includes circular shapes. Also included are variations on the above-mentioned shapes in which a repetitive pattern is superimposed over the basic shape. Examples of such patterns include serrations, and scalloped or wavy cutting edges.

It should also be appreciated that neither rotational symmetry nor n-pointed star geometry imply symmetry under reflection. In cases in which a specific cutting application generates torque primarily in one direction, the structures of the present invention may be constructed asymmetrically with abutment surfaces with smaller pressure angles for opposing the primary torque component. However, the invention will be illustrated by way of example in the context of symmetrical embodiments for opposing torques in both senses about the central axis.

Reference will be made throughout the specification and claims to a central axis of an insert. The axis in question is the axis about which the cutting edge exhibits rotational symmetry. Reference is also made to the "top" and "bottom" of the insert. Wherever such references appear, the insert is assumed to be mounted with its base downwards so as to present its cutting edge upwards and with its axis vertical.

In the context of triangular and square inserts, the designs of the present invention serve to provide bearing surfaces optimized for applications in which particularly large torques are generated.

In the case of cutting edges with larger numbers of sides, or where convexly curved cutting edges are used even with a small number of sides, the inherent geometry of the cutting edge does not provide surfaces suitable for opposing significant torques arising from the cutting forces. In these cases, the cutting inserts of the present invention are particularly valuable, providing much lower pressure angle abutment surfaces than provided by the prior art.

Reference is made in the description and claims to recessed and non-recessed shapes. It should be understood that the term "recess" is used in the description and claims to refer to a part of a shape or surface which is concave or otherwise generates a hollow. In more precise terms, a recess may be identified as any part of a shape or surface which lies interior to a virtual straight line connecting adjacent parts of the shape or surface. Conversely, a shape which at no point has a recess so defined is termed a "non-recessed" shape. Thus, the chevron of an n-pointed star constitutes a "recess" as herein defined, whereas a regular polygon is classified as a non-recessed shape.

Turning now to the features of cutting insert 10 in more detail, upper surface or "rake" 12 has, in this embodiment, an inwardly slanted, peripheral annular portion 20, bordered at the outer perimeter thereof by cutting edge 14, and a flat, inner annular portion 22, perpendicular to the axis of cutting insert 10.

Figure 1B:
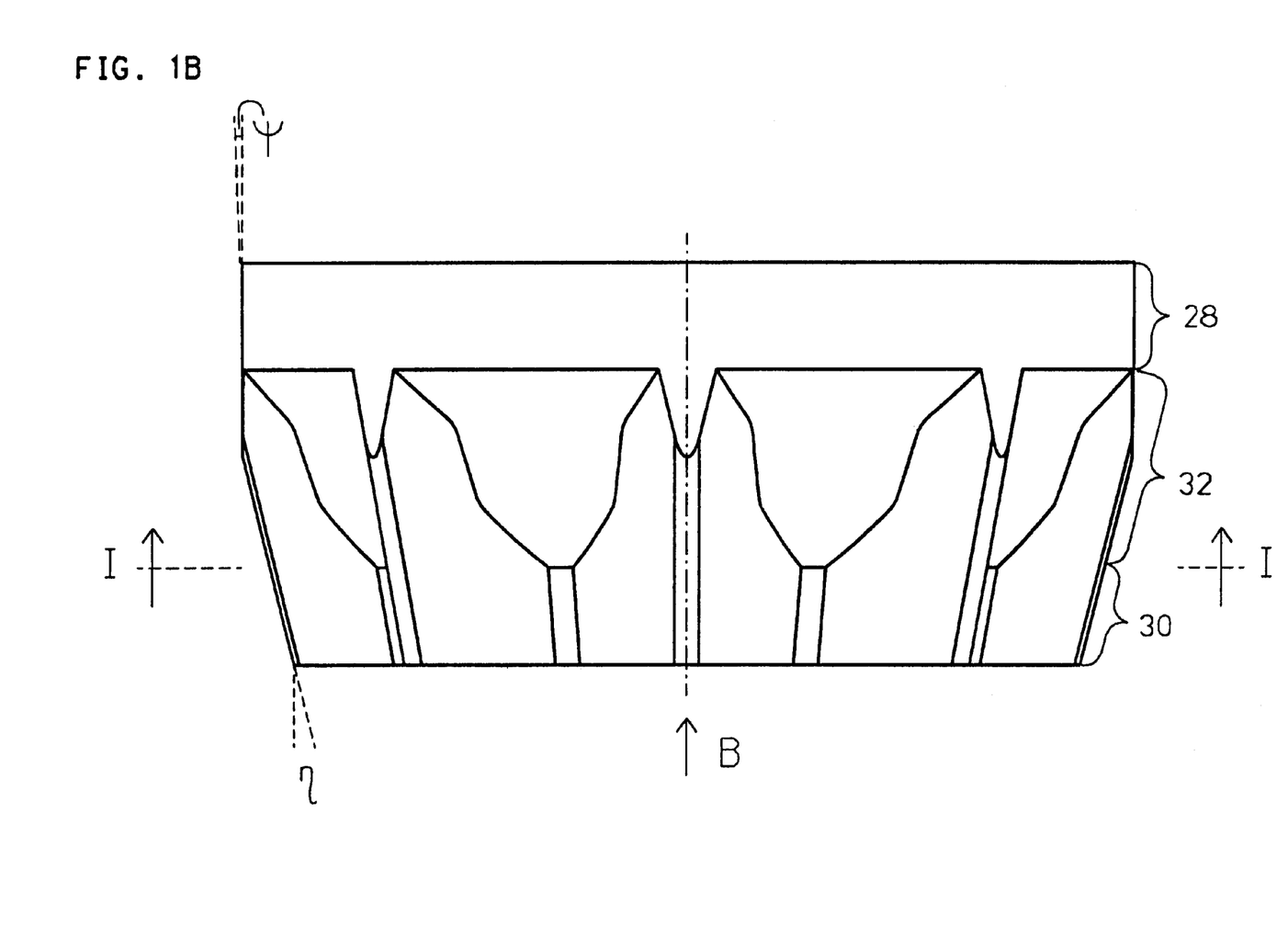
FIG. 1B is a side view of the cutting insert of FIG. 1A.

Upper surface 12 may also have additional chip control features such as a pattern of indentations or ridges. One such possibility is shown in FIG. 1E.

Figure 1C:
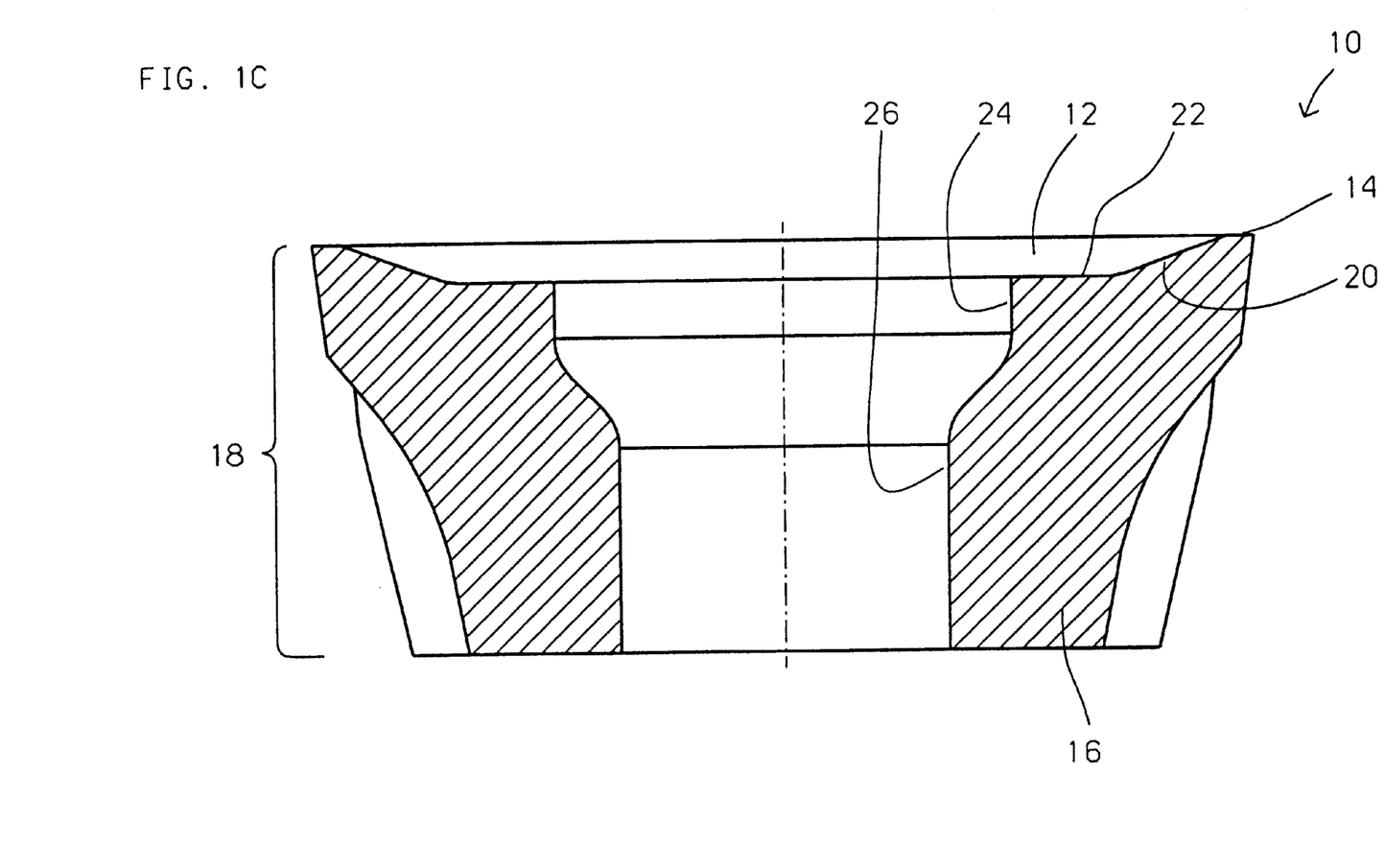
FIG. 1C is a side cross-sectional view of the cutting insert of FIG. 1A.

As can be best seen in FIG. 1C, inner annular portion 22 intersects at its inner extreme with a cylindrical extension 24 of a central, standard so-called "partly cylindrical" bore 26, used for the passage of a standard counter-sunk clamping screw (not shown). It should be appreciated that the specific clamping technique employed to clamp cutting insert 10 within a tool holder does not, per se, constitute a part of the present invention, and that variations may be made in accordance with any other clamping technique without straying from the scope of the present invention.

Turning now to peripheral flank surface 18, it is a particular feature of preferred embodiments of the present invention that peripheral flank surface 18 is shaped such that a first cross-section taken through the cutting insert perpendicular to the central axis and proximal to upper surface 12 is bounded by a non-recessed form, whereas a second cross-section taken through the cutting insert perpendicular to the central axis at a point closer to base 16 exhibits n-fold rotational symmetry and includes recessed features for providing abutment surfaces for opposing torque about the central axis.

To this end, peripheral flank surface 18 may be subdivided along the height of cutting insert 10 into at least two, and typically three, portions. A first portion adjacent to cutting edge 14 is denoted the relief flank surface 28 and has a non-recessed cross-sectional outline. The lower portion of peripheral flank surface 18 constitutes a ribbed flank surface 30 which provides recessed features having abutment surfaces for opposing torque about the central axis. Relief flank surface 28 and ribbed flank surface 30 are preferably linked by a transition flank surface portion 32 which provides a gradual transition between the two forms, as will be described below.

Relief flank surface 28 typically corresponds to the geometry of the cutting edge employed. Thus, in cutting insert 10, relief flank surface 28 has a frustro-conical form, having a circular cross-section corresponding to the circular cutting edge illustrated. Thus, relief flank surface 28 may be described as having substantially constant cross-sectional geometry perpendicular to the central axis at all heights, although the dimensions of this geometry may vary somewhat with height. Relief flank surface 28 preferably extends downwards from cutting edge 14 at least about a tenth of the height of cutting insert 10.

Relief flank surface 28 is typically inclined at an acute angle $\psi$ relative to the central axis of cutting insert 10. Angle $\psi$ is commonly denoted the insert's "primary normal relief angle" and is preferably less than about 20° and typically about 7°. For a negative insert, $\psi$ may be about 0° such that relief flank surface 28 is cylindrical.

Turning now to the features of ribbed flank surface 30 in more detail, this is preferably implemented as a frusto-pyramidal ribbed surface with channels 32 formed between projecting ridges 34. Channels 33 preferably have a chevron-type cross-section.

Ribbed flank surface 30 extends from base 16 to a plane perpendicular to the insert axis indicated in FIG. 1B as plane I—I. Ribbed flank surface 30 preferably extends for at least about an eighth, and typically for at least about a quarter, of the height of the cutting insert. Depending on the design of transition flank surface 32, ribbed flank surface 30 may extend along the majority of the height of peripheral flank surface 18.

Ribbed flank surface 30 may be regarded as having "n" ridges 34 each having a crest 36 blending smoothly with a pair of planar, oppositely sloping, lateral abutment surfaces 38. At the junction of adjacent ridges, adjacent abutment surfaces 38 intersect at smoothed root regions 40. The number of ridges is equal to the number of available indexing positions of the insert. For a circular cutting edge, n is preferably at least 5, and typically 8 or more.

Figure 2A:
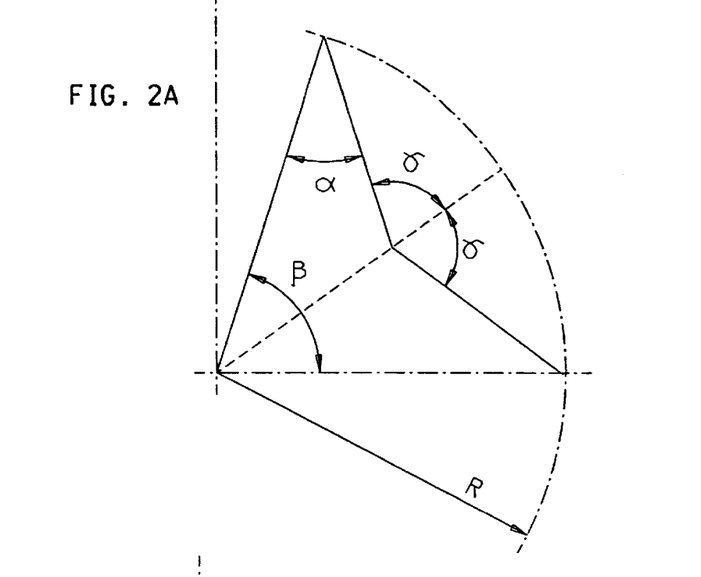
FIG. 2A is a schematic representation of a geometric generating segment according to the teachings of the present invention showing the definitions of certain angles to be referred to in the description.
Figure 2B:
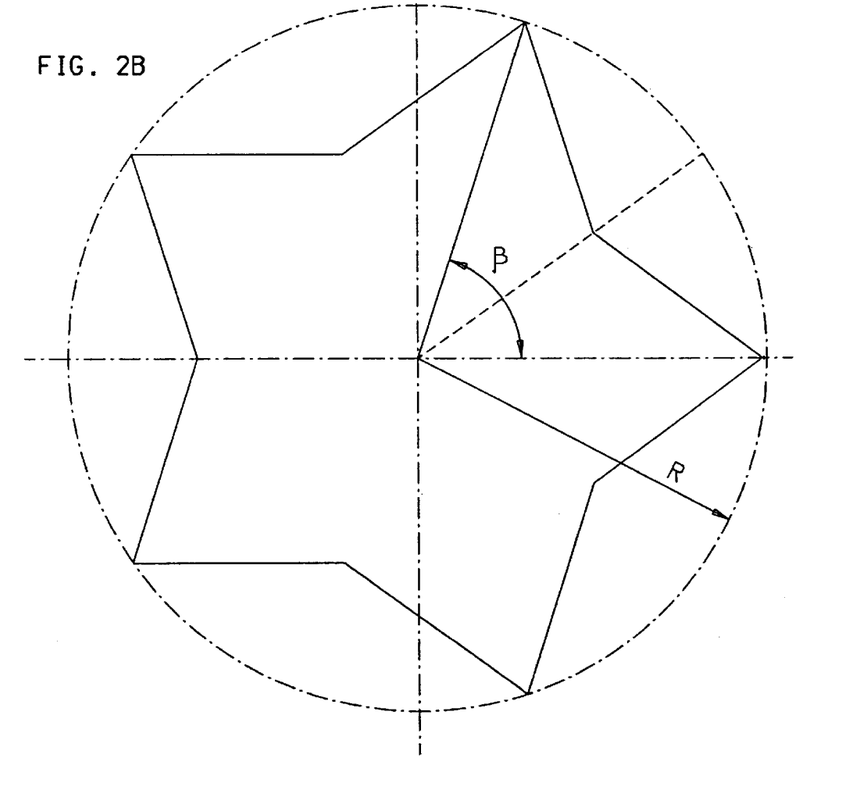
FIG. 2B is a schematic representation of the geometry of a cross-section through a cutting insert constructed and operative according to the teachings of the present invention, the geometry being produced by rotational copying of the generating segment of FIG. 2A.
Figure 3:
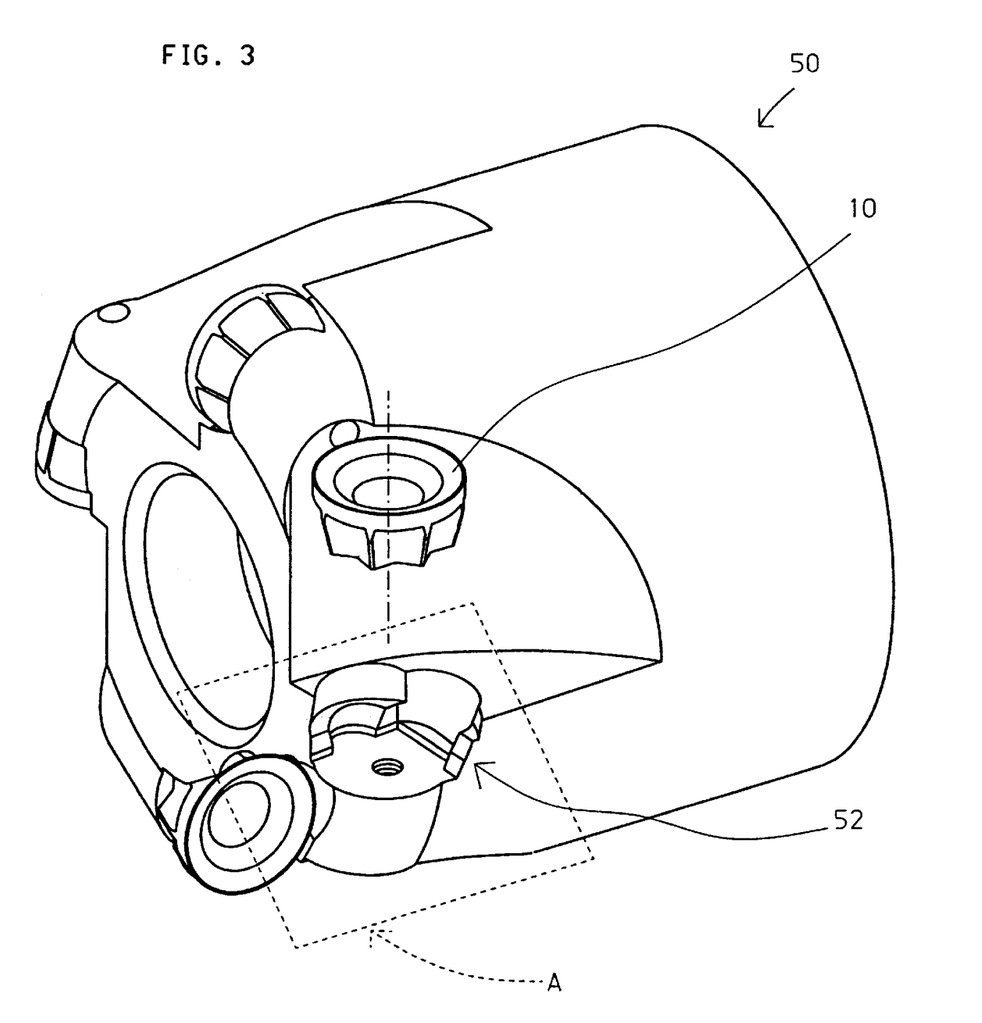
FIG. 3 is a partially dissembled perspective view of a machine tool cutter, constructed and operative according to the teachings of the present invention, including four of the cutting inserts of FIG. 1A mounted in pockets of a tool holder.

Turning briefly to FIGS. 2A and 2B, these illustrate how the cross-section of ribbed flank surface 30, shown here with n=5 may be considered an n-pointed star (FIG. 2B) defined by rotationally copying n−1 times a concave chevron-shaped "generating segment" (FIG. 2A) having symmetric legs on either side of a bi-secting radius. The generating segment subtends a central pitch angle $\beta$ equal to $360°/n$.

As will be discussed further below, it is a feature of preferred embodiments of cutting insert 10 that two spaced-apart abutment surfaces 38 are coplanar. In a simple example, this may be achieved by ensuring that the symmetrical legs of the generating segment form angles $\gamma$ relative to a bisecting radius equal to $(90°-\beta/2°)$. The corresponding pressure angle $\alpha$ is equal to $(90°-\beta°)$. Thus, with the eight corner embodiment illustrated, $\alpha=45°$, $\beta=45°$, and $\gamma=67.5°$. Where larger numbers of corners are employed, the coplanar surfaces may be two or more ridges apart.

It is a further feature of preferred embodiments of cutting insert 10 that the two spaced-apart abutment surfaces 38 have perpendicular intersections with a cross-section taken through cutting insert 10 perpendicular to its axis. The surfaces themselves may vary from perpendicular due to tapering of ribbed flank surface 30. However, for convenience of reference, such surfaces are referred to as "perpendicular abutment surfaces". This requirement may also be defined by simple geometrical conditions and, by way of example, is provided by the angles of the eight cornered embodiment listed above. Furthermore, the existence of at least some mutually perpendicular abutment surfaces follows immediately in any case in which n is a multiple of 4.

In a preferred embodiment, ribbed flank surface 30 is ideally frusto-pyramidal, meaning, among other things, that all the lateral abutment surfaces 38 form the same angle $\eta$ relative to the axis of cutting insert 10, as indicated in FIG. 1B. As a direct consequence, an imaginary straight line of intersection between pairs of lateral surfaces 38 associated with each ridge 36, passing through aligned corners of such ideally star-shaped polygonal contour sections as defined above, forms a corresponding angle $\phi$ with a normal to the base which is a function of both $\alpha$ and $\eta$, given by: $\phi=\arctan[\sin(\alpha)\tan(\eta)]$. The angle $\phi$ is larger than the relief angle $\psi$ relating to the uppermost relief flank surface portion 28. Given that the pressure angle $\alpha$ is less than 90°, it follows that $\phi>\eta$. Naturally, all the ideally star-shaped polygonal contour sections are similar to one another, viz. can be obtained from one another by a mere change of scale.

Figure 1D:
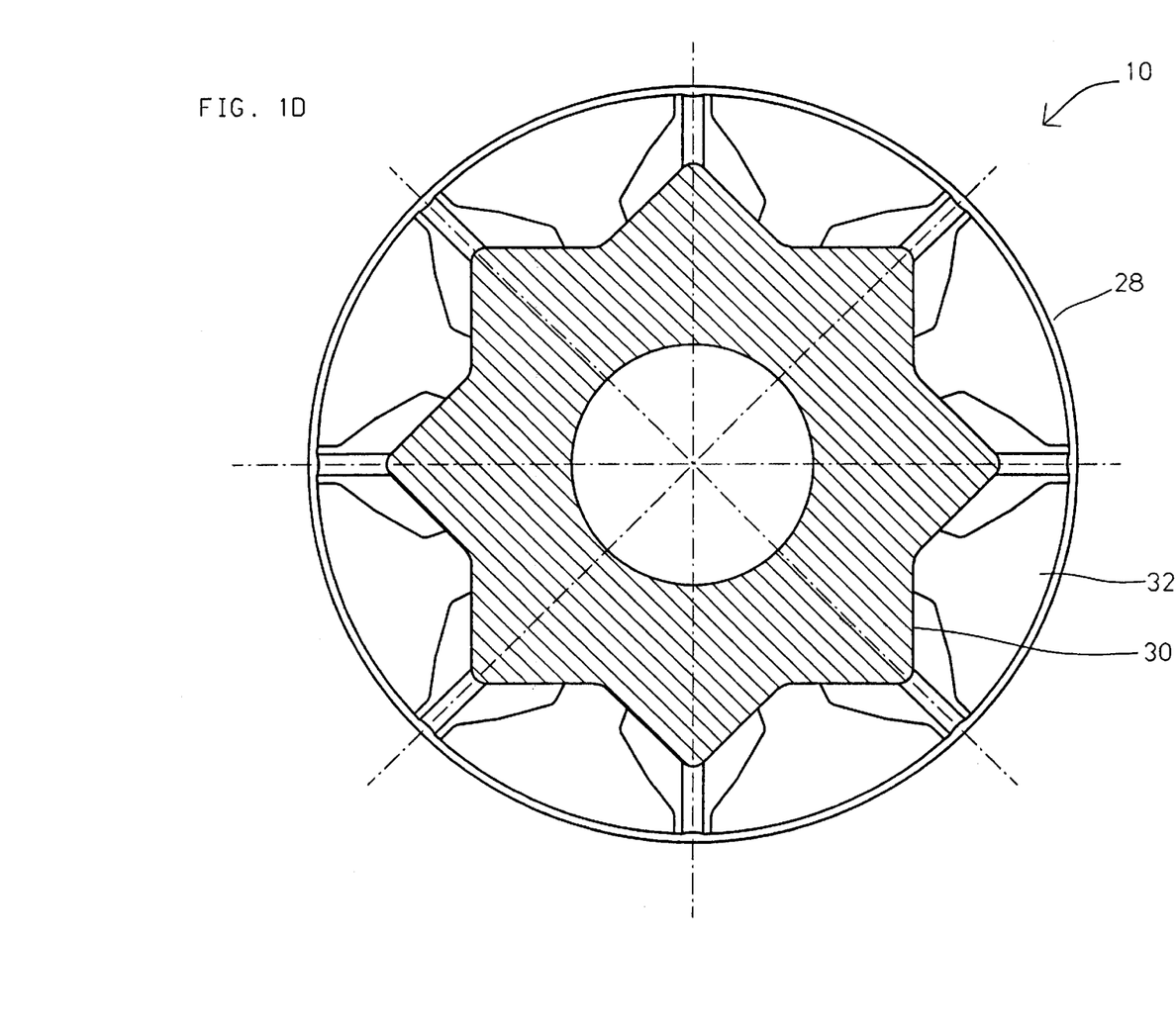
FIG. 1D is a partially cross-sectional upward view taken along the line I—I of FIG. 1B.
Figure 1E:
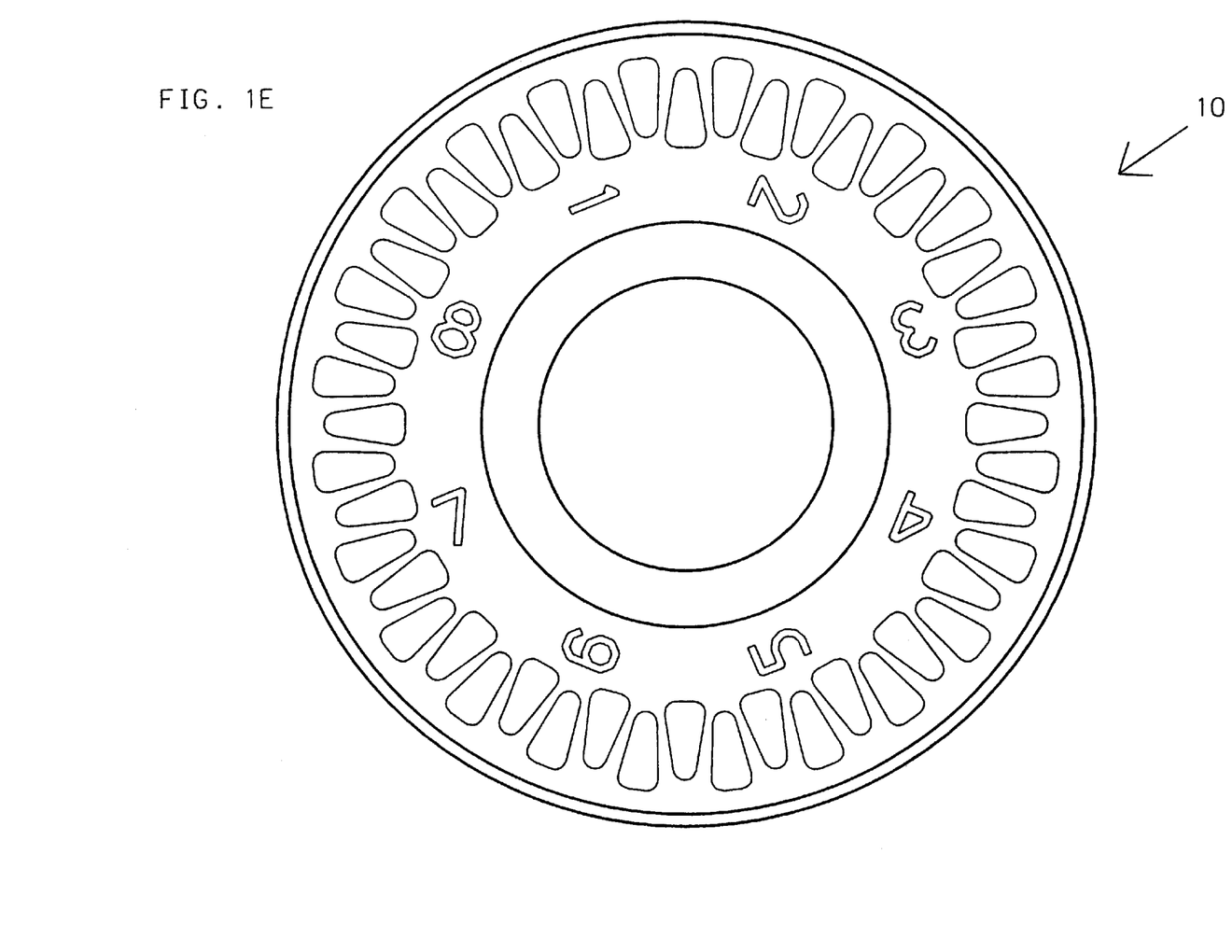
FIG. 1E is a top view of the cutting insert of FIG. 1A.

FIG. 1D shows ribbed flank surface 30 in section on plane I—I of FIG. 1B, i.e., at the junction between ribbed flank surface 30 and transition flank surface 32. It can be seen that the star-shaped polygonal contour of ribbed flank surface 30 is modified from the ideal shape in that the ridges 36 and crotches 40 have been truncated and/or rounded out. In practice, that all star-shaped polygonal contours on all horizontal planes of the lowermost body portion are typically identically modified, i.e., having ridges 36 and crotches 40 are truncated with the same width of filleted chamfers to produce ridges and root regions with constant widths, as seen in FIG. 1B. As a result, in the preferred embodiment, the modified star-shaped contours are not, strictly speaking, similar in the sense of Euclidean geometry. Since ridges 36 and root regions 40 have uniform widths along their respective length extents, they form the same angle $\phi$ with a normal to the base as the imaginary line of intersection between lateral abutment surfaces 38.

As the root regions 40 are transformed into the tapered surfaces 42 with the onset of the transition flank surface 32, the part of the star-shaped polygonal contours nearest to crotch region 40 is gradually lost. The geometry of abutment surfaces 38 near to ridges 36, on the other hand, is maintained until the junction between transition flank surface portion 32 and relief flank surface 28 where ridges 36 themselves merge with relief flank surface 28.

Transition flank surface portion 32, itself, results from the superposition or union of a prolongation of the ribbed portion of ribbed flank surface 30 with a tapered surface 42, best seen in FIG. 1A. As a result, transition flank surface portion 32 provides a gradual transition over which the depth of the channels in peripheral flank surface 18 are gradually reduced towards relief flank surface 28. Preferably, transition flank surface portion 32 extends for at least about a third of the height of the cutting insert.

For powder metallurgy technological reasons, as well as for structural reasons, given that the cutting edge is directly buttressed by the in-board section bounded by the tapered surface 42, the angle formed between tapered surface 42 and a plane perpendicular to the axis of the insert should not be less than around 60°. However, this angle cannot be increased greatly beyond 60° without seriously limiting the height available for ribbed flank surface 30 with its lateral abutment surfaces 38 which are used for resisting torque deriving from cutting forces, as will be explained herein below. The detailed shape of tapered surfaces 42 may vary considerably. Preferred examples include frusto-conical (i.e., rounded) or frusto-pyramidic (i.e., flat surfaced) segments.

Turning now to FIGS. 3–6, there is shown a machine tool cutter or tool holder, generally designated 50, constructed and operative according to the teachings of the present invention, employing a number of cutting inserts 10 mounted in insert receiving pockets 52.

Each pocket 52 is formed with a base abutment surface 54 for supporting the base, and at least two, and preferably three, lateral abutment surfaces 56, 58, and 60 located for abutting angularly spaced abutment surfaces 38 provided by cutting insert 10. The combination of these lateral abutment surfaces provides a lateral support/restraint system structurally capable of resisting considerable torque. The other portions of the lateral walls of pocket 52 may have any convenient shape and structure, as long as these surfaces do not interfere with the insert.

The receiving pocket may be an integral part of the tool holder or an adapter part connected in any suitable way to the tool holder. In the latter case, a single tool holder may be made to receive, through a suitable range of adapters, a corresponding range of indexable inserts.

Figure 5:
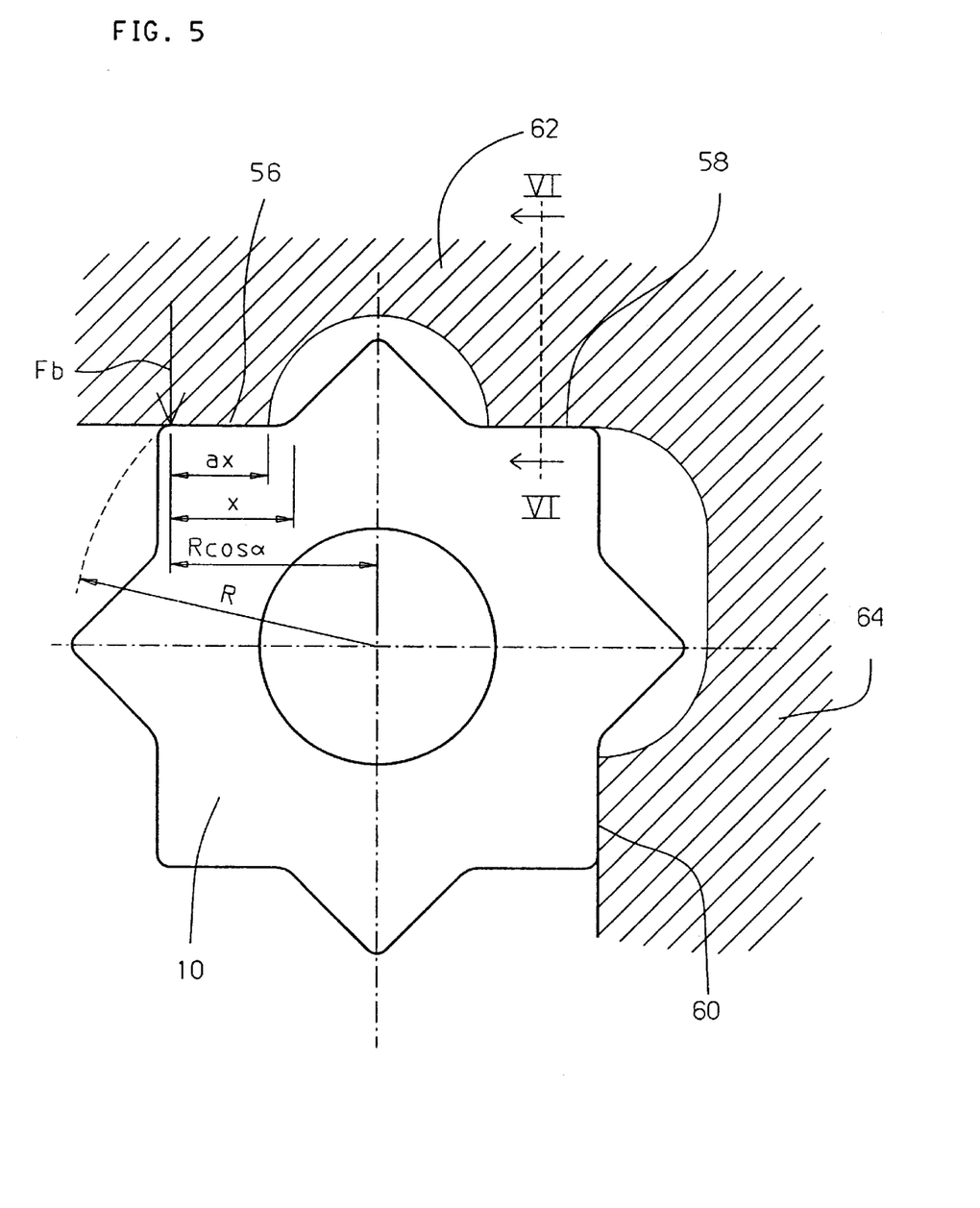
FIG. 5 is a horizontal cross-sectional view showing the abutment geometry of the cutting insert of FIG. 1A in the pocket of FIG. 4.
Figure 6:
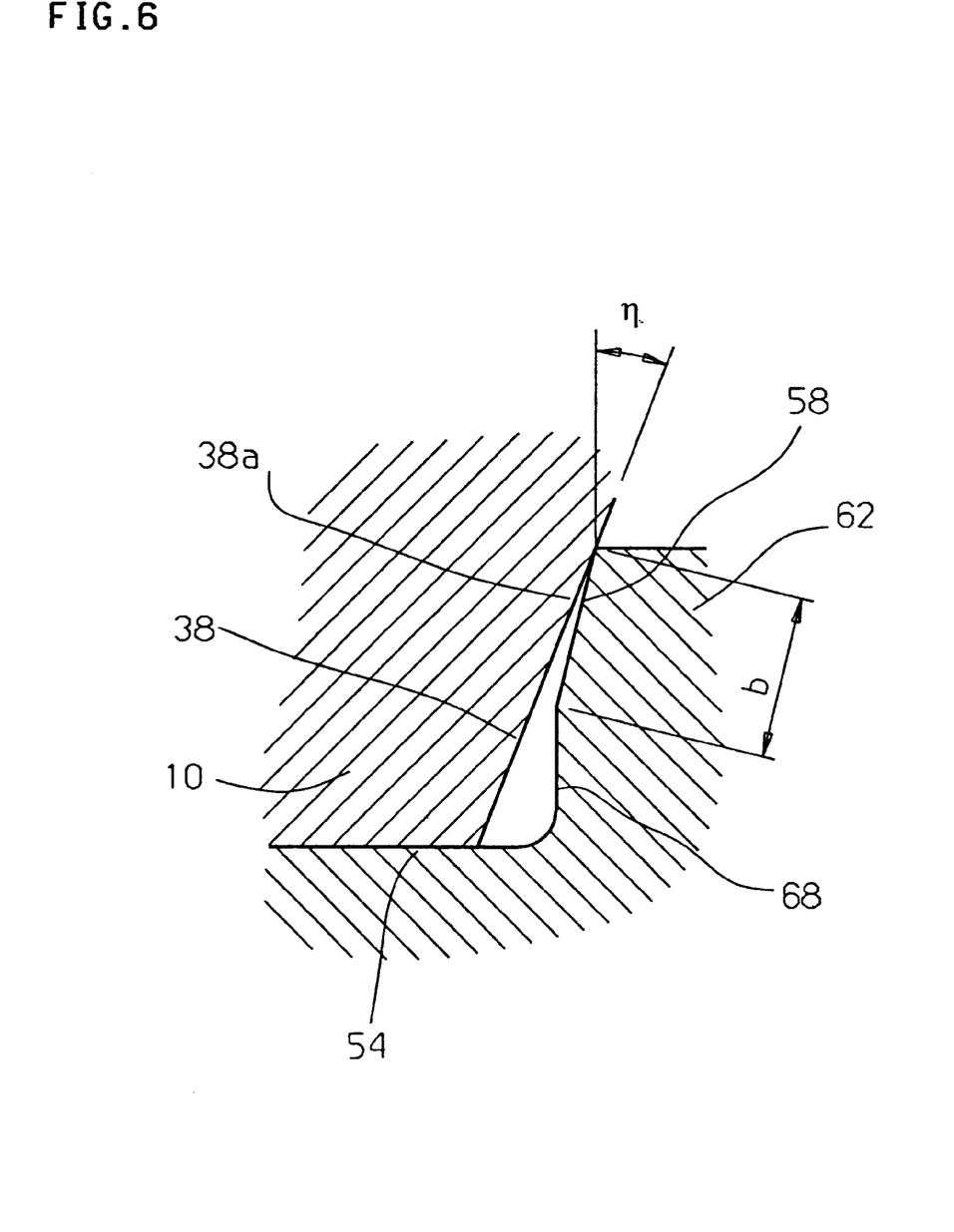
FIG. 6 is a partial vertical cross-sectional view showing a preferred geometry of contact between the cutting insert of FIG. 1A and one of the abutment surfaces of the pocket of FIG. 4.

Additional features of pocket 52 are shown in the schematic sectional views of FIGS. 5 and 6. Pocket 52 has two generally perpendicular lateral walls, 62 and 64, with lateral abutment surfaces 56 and 58 integrally formed with wall 62 and abutment surface 60 integrally formed with wall 64. Abutment surfaces 56, 58, and 60 preferably do not extend all the way to the base 54 of the insert receiving pocket 52. At their lowermost border, the abutment surfaces meet in recessed bottom portions which are slanted away from the insert. By way of an example, FIG. 6 which is a fragmentary cross-section of FIG. 5 on plane VI—VI shows the innermost of the co-planar abutment surfaces 58 of the lateral wall 62 and an associated recessed bottom portion 68 of the same wall.

It will be understood that the innermost of the two co-planar abutment surfaces, i.e. abutment surface 58, of the lateral wall 62 may be omitted since the remaining abutment surfaces 56 and 60 fully define an effective lateral support/restraint system.

As also exemplified in FIG. 6, the abutment surfaces lie on planes which are slanted in such a way as to match the slant of the insert lateral surfaces 38, i.e., they make an angle with a normal to the base of the platform of the receiving pocket that is substantially equal to the angle $\eta$ made by the insert lateral surfaces 38. A fresh receiving pocket is manufactured with tolerances for the abutment surfaces slanting angles such that upon initial assembly of an insert in its pertaining receiving pocket contact is initialized at an upper region of the abutment surface. Upon plastic deformation of this surface, during mostly the initial clamping, contact spreads from the upper region and gradually encompasses the entire area of the abutment surface. In this way a bearing surface 38$a$ corresponding to the "foot-print" of the abutment surface is established, in the form of a band of depth "b" corresponding to the depth of the abutment surface, on the juxtaposed pertaining lateral surface 38 towards the top of the ribbed flank surface 30 and extending by about b/2 into the transition surface portion 32.

Figure 4:
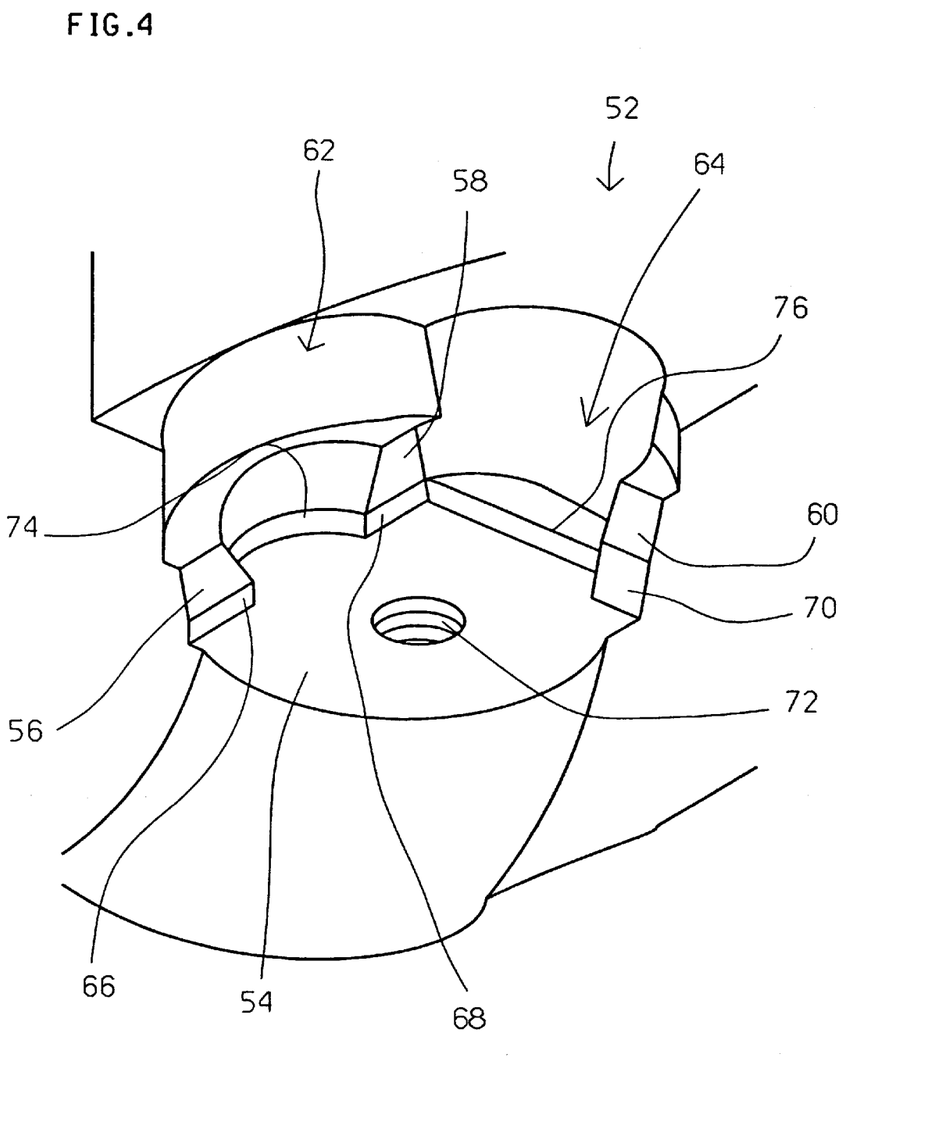
FIG. 4 is an enlarged perspective view of one of the pockets of the tool holder of FIG. 3.

Turning now to a number of additional features of tool holder 50, FIG. 4 shows pocket 52 in which base 54 is substantially planar with a central threaded bore 72. The lateral wall 62 includes the previously mentioned co-planar abutment surfaces 56 and 58, recessed bottom portions 66 and 68, and a relief surface 74. The lateral wall 64 includes the perpendicular abutment surface 60, a recessed bottom portion 70 and a relief surface 76. Threaded bore 72 is very slightly off-set from the through bore 26 of the insert when the latter is seated in the receiving pocket firmly clamped with its clamping screw. This is to assure that the bearing surfaces of the insert are biased against the corresponding abutment surfaces of the receiving pocket.

Referring to FIG. 1A, cutting insert 10 has been illustrated with eight indexable stations, as identified on the annular portion 22 of the upper face 12 by the corresponding numerals and as manifested by the use of eight rotational symmetric ridges. It should be appreciated, however, that the invention allows a considerably larger number of indexing stations without unduly increasing the pressure stresses on the bearing surface of the insert and abutment surface of the pocket. The following considerations show how this contact pressure stress increases with the number of ridges.

Referring to FIG. 5, the bearing force $F_b$ transmitted between an insert bearing surface 38$a$ of cutting insert 10 and a juxtaposed outermost abutment surface 56 of the receiving pocket 52 of tool holder 50, derives from the cutting force generating an applied torque M, thus:

$$F_b = M/(R\cos(\alpha)) \qquad (1)$$

where R is the mean radius at the outer perimeter of the contact bearing surface 38$a$ and $\alpha$ is the pressure angle.

The resulting pressure on the bearing surface is:

$$P = F_b/A \qquad (2)$$

wherein A is the area of the bearing surface, and $$A = b\, ax \qquad (3)$$

where b and ax are respectively the depth and the length of the active bearing surface.

From the sinus theorem:

$$x = R\sin(\beta/2)/\sin(\pi - \alpha - \beta/2) \qquad (4)$$

where $\beta$ is the angle formed by the radiuses passing through the crests of two adjacent ridges, viz. the central pitch angle $\beta$ equal to 360°/n as subtended by the generating segment (see FIGS. 2A and 5). Now, from before:

$$\alpha = 90° - \beta \qquad (5)$$

Therefore:

$$P = (M/R^2 ba)/(\tan(\beta/2)/\sin\beta) \qquad (6)$$

where a=A/bx (from equation (3)).

Figure 8:
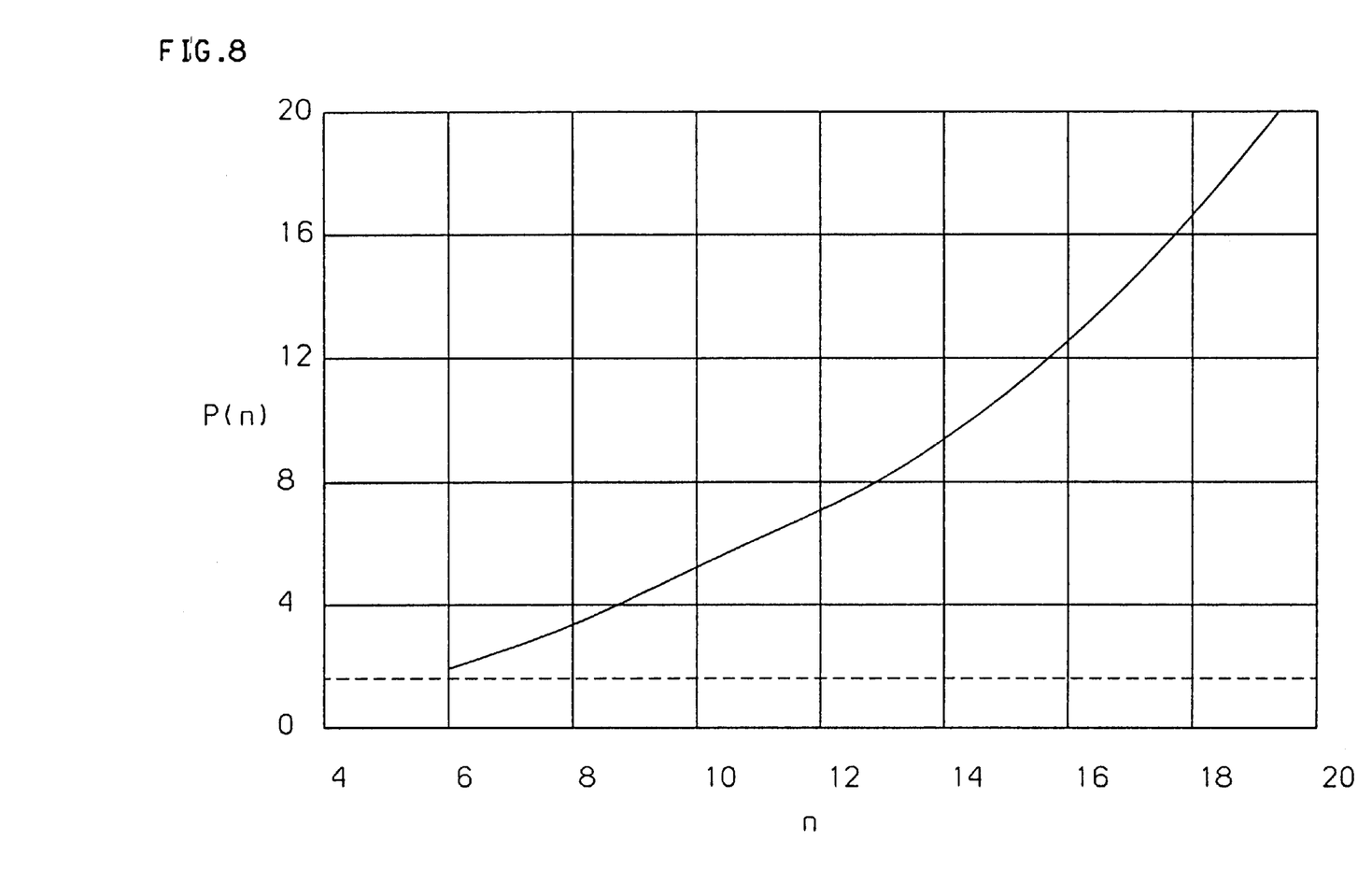
FIG. 8 is a representation of the variation of pressure on bearing surfaces as a function of the number of ridges of the inserts according to the teachings of the present invention.

It is normal design practice that the contact pressure stress be kept within an allowable stress limit of the weakest material (e.g., the endurance limit of the tool steel on the pocket side). As can be seen from equation (6), the pressure is a function of two factors, the first of which, $M/R^2 ba$, is inversely proportional to $R^2$, if the ratio M/ba can be assumed to be independent of the radius, and the second of which (which may be called "the dimensionless pressure stress", viz., $p = P/(M/R^2 ba) = 1/(\tan(\beta/2)/\sin\beta)$, is a function of $\beta$ only. Since $\beta$, as has been said, is equal to 360°/n, where n is the number of ridges, the dimensionless pressure stress is a function of n. By plotting p(n) as shown in FIG. 8, it is found that it is a nearly exponentially rising function. Its smallest value, here shown as corresponding to a 6-ridges insert, is increased by about ten times with a 20-ridges configuration. As indicated, the preferred 8-ridges configuration only increases the pressure stress by 50% above the minimum.

On the other hand, it is clear that the larger the radius R, the smaller the stress, which is inversely proportional to the square of the radius. Thus, increasing the radius by 3 times reduces the stress by a factor of $3^2 = 9$. Therefore, if the stress of a 6-ridges insert of radius R is acceptable, a 20-ridges insert of radius 3R will produce the same stress. So, for example, in a situation where a small insert having 6 corners is within an applied stress limit, making the insert larger would reduce the stress by a factor 9. Therefore, the number of ridges can be increased from 6 to 20 without increasing the stress by scaling the insert up by a factor of 3, and such a scaling-up is generally admissible in a given application. These considerations indicate that 20 is preferably the upper limit of the number of insert ridges.

Figure 7:
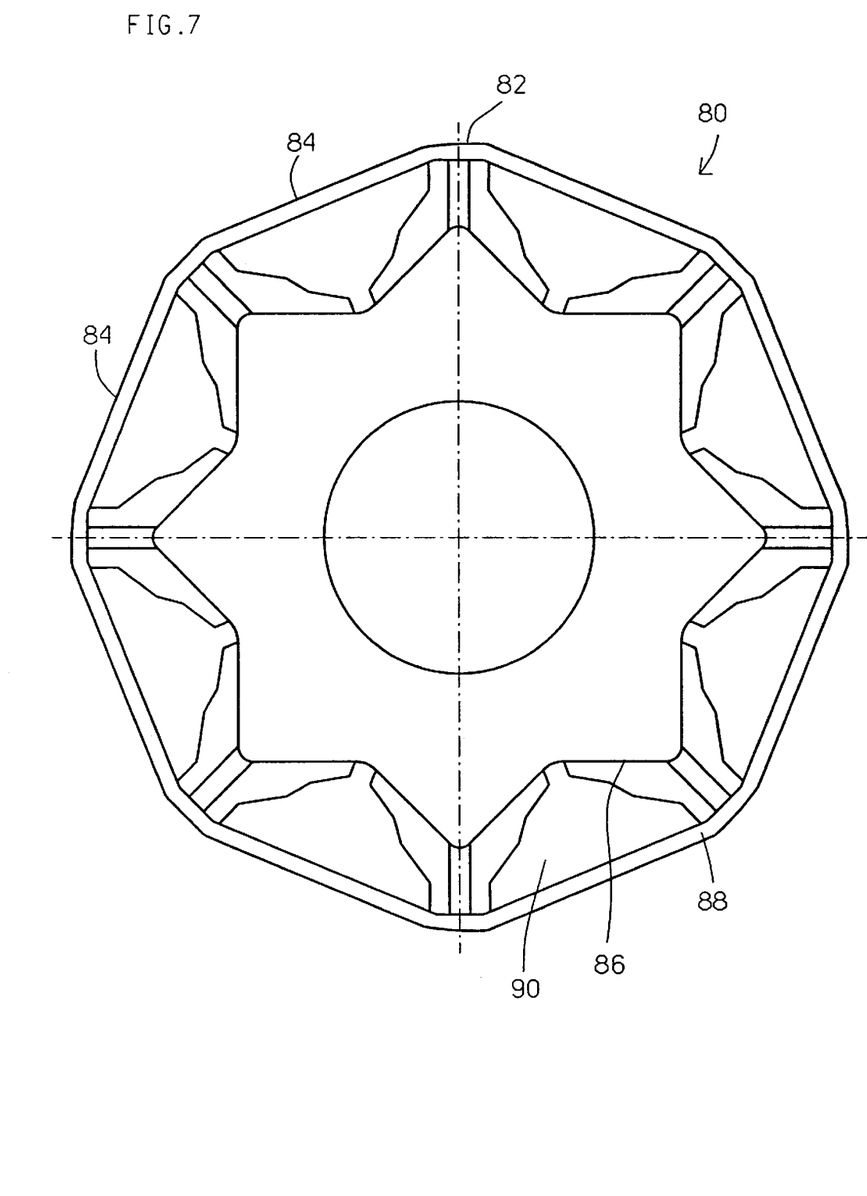
FIG. 7 is a bottom view of a second preferred embodiment of a cutting insert, constructed and operative according to the teachings of the present invention, having an polygonal cutting edge.

Turning now to FIG. 7, a second embodiment of a cutting insert, generally designated 80, constructed and operative according to the teachings of the present invention, is shown. Generally speaking, cutting insert 80 is similar to cutting insert 10 except that cutting insert 80 features a polygonal cutting edge 82 with eight indexable cutting edges 84. The cutting edges are coordinated with an 8-ridged flank surface 86, similar to ribbed flank surface 30 described above.

Clearly, in this case the relief flank surface 88 has a polygonal shape matching the cutting edge 82 and the tapered surface 90 of the transition surface portion is preferably frusto-pyramidic.

While two embodiments of the invention has been described by way of illustration, and some variations thereof have been mentioned, it will be understood that the embodiment and the variations are merely exemplary and that the invention may be carried out with many other mechanical modifications and adaptations, without departing from its spirit or exceeding the scope of the claims. For instance, the number of indexing stations and the number of ridges of the flank surface of the insert, as well as the dimensional proportions of the insert and the receiving pocket, may vary considerably, the shape of the surfaces that are not critical to the invention may vary considerably.

It will be appreciated that the above descriptions are intended only to serve as examples, and that many other embodiments are possible within the spirit and the scope of the present invention.

What is claimed is:

1. A cutting insert having an upper surface bounded by a cutting edge, a base, a peripheral flank surfaces a central axis and an axial clamping bore, wherein said peripheral flank surface includes: a relief flank surface portion adjacent to, and extending downwards from, said cutting edge, said relief flank surface portion being shaped such that a first cross-section taken through said relief flank surface portion perpendicular to said central axis is bounded by a non-recessed form; a lower flank surface portion formed such that an outer periphery of a second cross-section taken through the cutting insert perpendicular to said central axis and passing through said lower flank surface portion exhibits n-fold rotational symmetry where n is at least 5, said outer periphery of said second cross-section including recesses corresponding to recessed channels in said lower flank surface for providing abutment surfaces for opposing torque about said central axis; and a transition flank surface portion located between said relief flank surface portion and said lower flank surface portion, said transition flank surface portion being formed such that a depth of said recessed channels gradually decreases towards said relief flank surface portion.

2. The cutting insert of claim 1, wherein said peripheral flank surface is shaped such that said first cross-section exhibits a substantially circular form.

3. The cutting insert of claim 1, wherein said peripheral flank surface is shaped such that said first cross-section exhibits a substantially polygonal form.

4. The cutting insert of claim 1, wherein n is at least 8.

5. The cutting insert of claim 1, wherein said outer periphery of said second cross-section exhibits a substantially n-pointed-star geometry including perpendicular abutment surfaces.

6. The cutting insert of claim 1, wherein said substantially n-pointed-star geometry extends from proximal to said base to at least about an eighth of the height of the cutting insert.

7. The cutting insert of claim 1, wherein said substantially n-pointed-star geometry extends from proximal to said base to at least about a quarter of the height of the cutting insert.

8. The cutting insert of claim 1, wherein said relief flank surface portion extends downwards from said cutting edge for at least about a tenth of the height of the cutting insert.

9. The cutting insert of claim 1, wherein said transition flank surface portion extends for at least about a third of the height of the cutting insert.

10. A cutting tool assembly comprising:
    (a) the cutting insert of claim 1; and
    (b) a tool holder having at least one pocket for receiving the cutting insert, said pocket being formed with a base abutment surface for supporting said base, and at least two lateral abutment surfaces located for abutting angularly spaced surfaces provided by said recessed channels in said lower flank surface so as to oppose a torque applied to the cutting insert.

11. The cutting tool assembly of claim 10, wherein said at least two lateral abutment surfaces include two substantially perpendicular surfaces.

12. The cutting tool assembly of claim 10, wherein said at least two lateral abutment surfaces are implemented as three lateral abutment surfaces which include two substantially co-planar surfaces.

13. The cutting insert of claim 1, further comprising an axial clamping bore.

14. The cutting insert of claim 13, wherein said cutting edge is round.

15. A cutting tool assembly comprising:
    (a) the cutting insert of claim 13; and
    (b) a tool holder having at least one pocket for receiving the cutting insert, said pocket being formed with a base abutment surface for supporting said base, and at least two lateral abutment surfaces located for abutting angularly spaced surfaces provided by said recessed features so as to oppose a torque applied to the cutting insert.

16. The cutting tool assembly of claim 15, wherein said at least two lateral abutment surfaces include two substantially perpendicular surfaces.

17. The cutting tool assembly of claim 15, wherein said at least two lateral abutment surfaces are implemented as three lateral abutment surfaces which include two substantially co-planar surfaces.

18. The cutting insert of claim 1, wherein said recessed channels have a chevron-type cross-section.

19. The cutting insert of claim 18, wherein the surfaces of said recessed channels are angled so as to provide perpendicular abutment surfaces.

20. The cutting insert of claim 18, wherein said recessed channels extend from proximal to said base to at least about an eighth of the height of the cutting insert.

21. The cutting insert of claim 18, wherein said recessed channels extend from proximal to said base to at least about a quarter of the height of the cutting insert.

22. The cutting insert of claim 18, wherein said relief flank surface portion extends downwards from said cutting edge for at least about a tenth of the height of the cutting insert.

23. The cutting insert of claim 22, wherein said transition flank surface portion extends for at least about a third of the height of the cutting insert.

* * * * *